Feb. 29, 1944.                    E. KLUG                    2,343,148
           METHOD OF AND APPARATUS FOR TAPING ARTICLES
                 Filed April 30, 1942           5 Sheets-Sheet 1
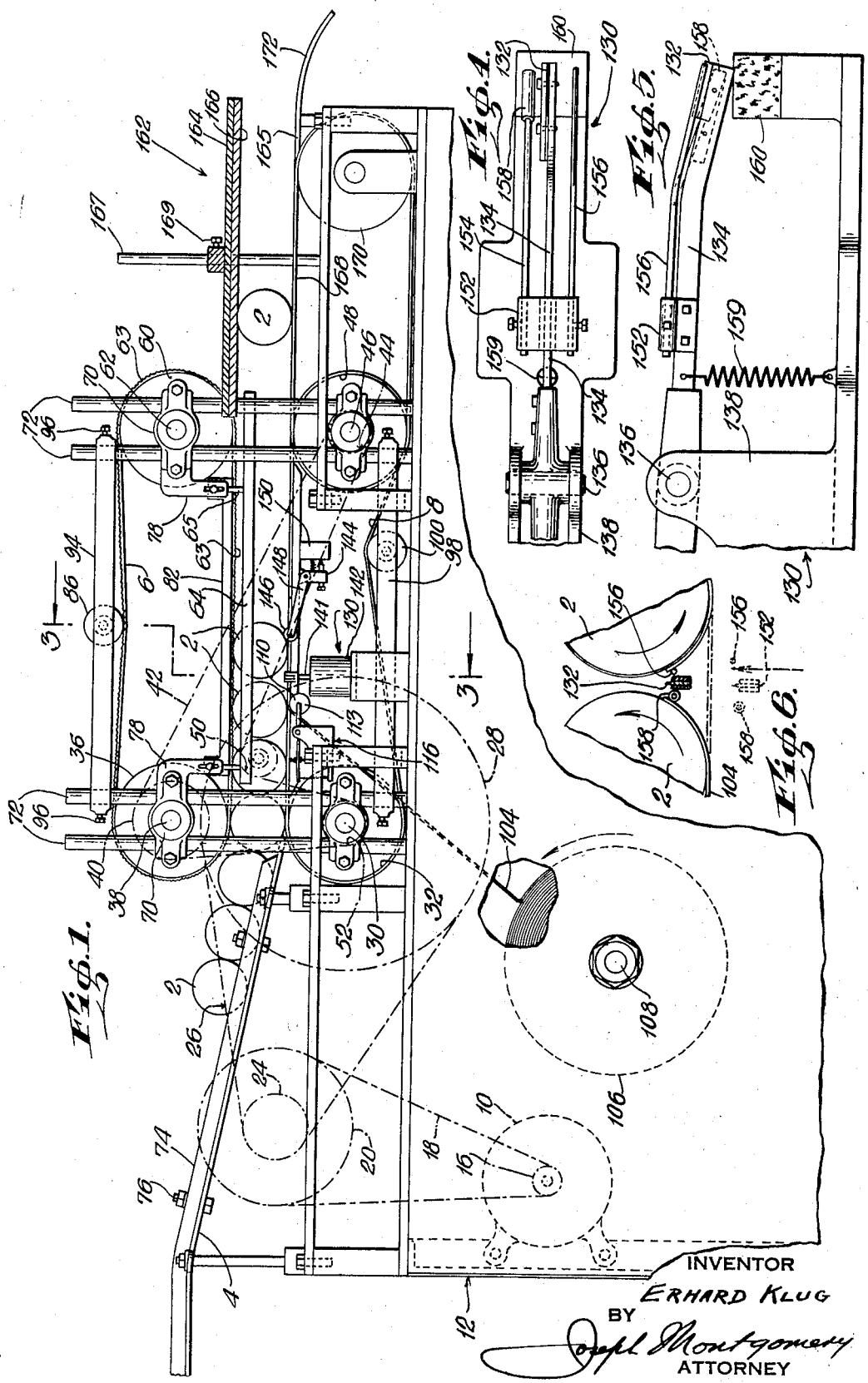
INVENTOR
ERHARD KLUG
BY
Joseph Montgomery
ATTORNEY

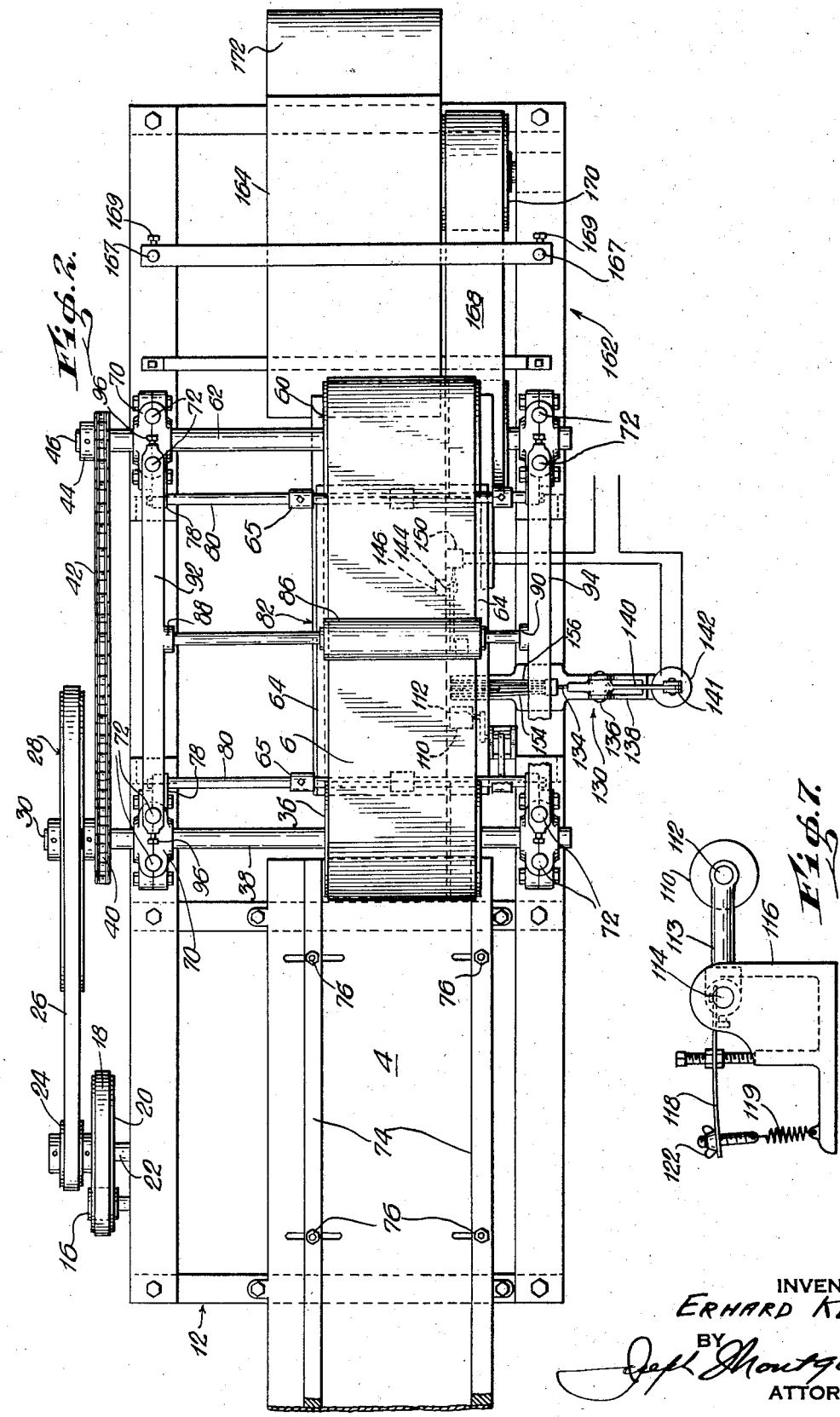

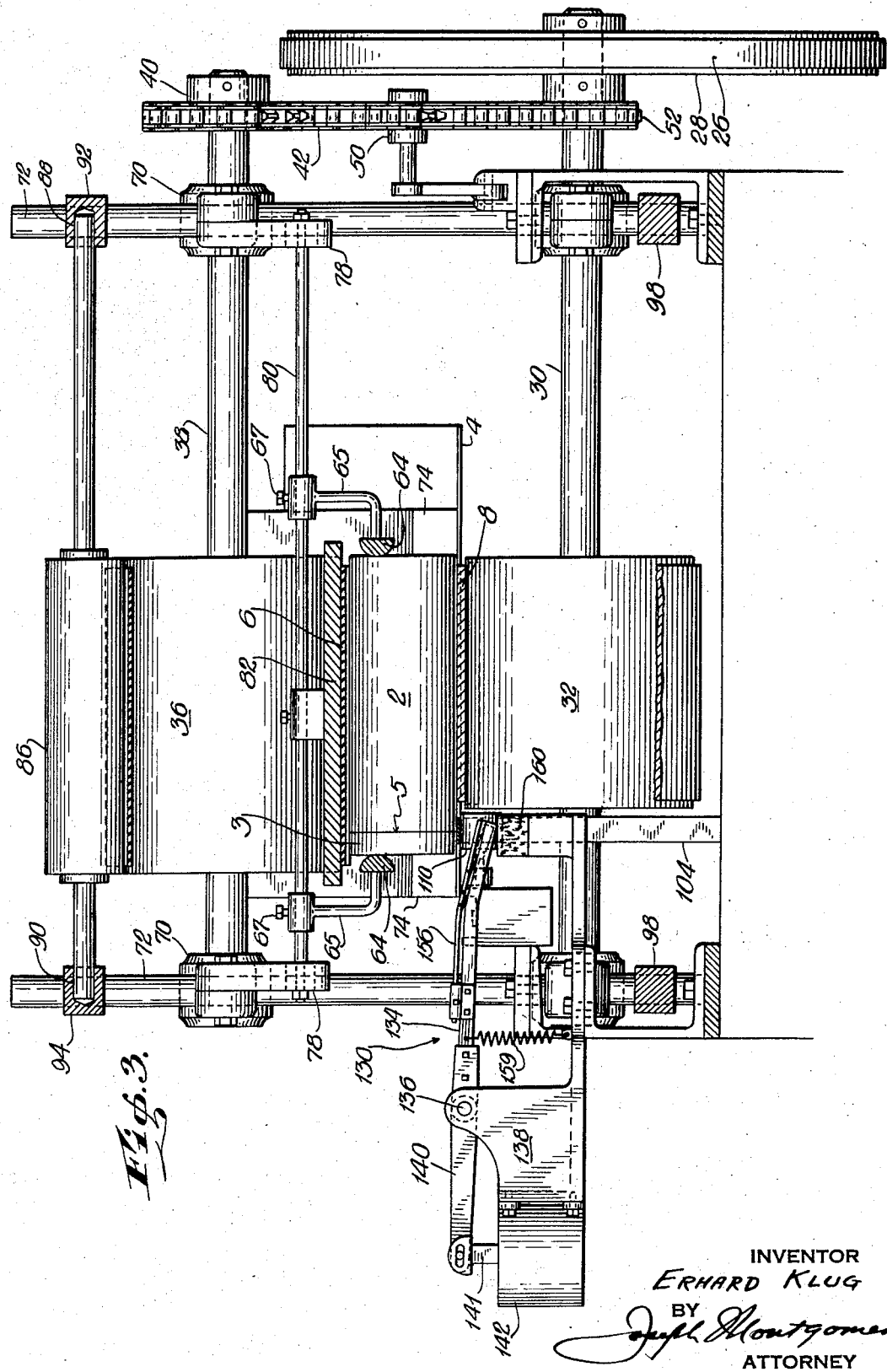

Feb. 29, 1944.  E. KLUG  2,343,148
METHOD OF AND APPARATUS FOR TAPING ARTICLES
Filed April 30, 1942   5 Sheets-Sheet 4
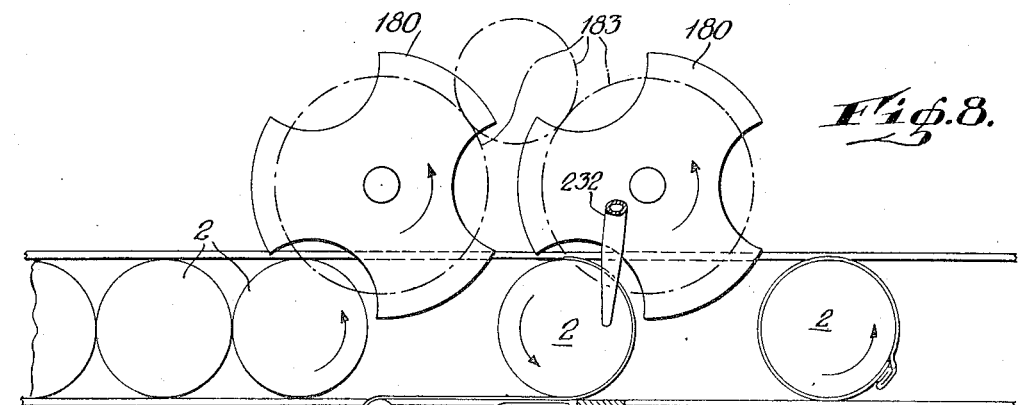
Fig. 8.
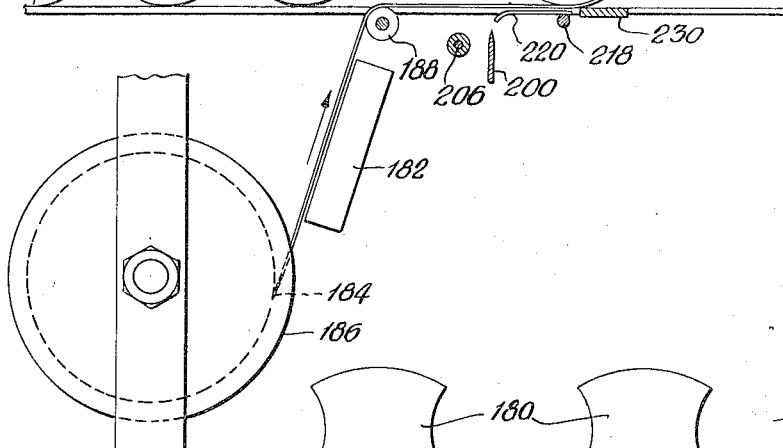
Fig. 9.
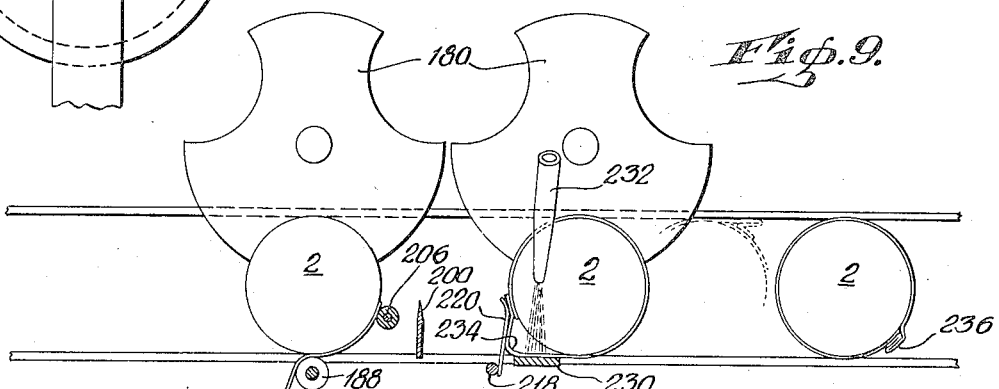
Fig. 10.
Fig. 11.
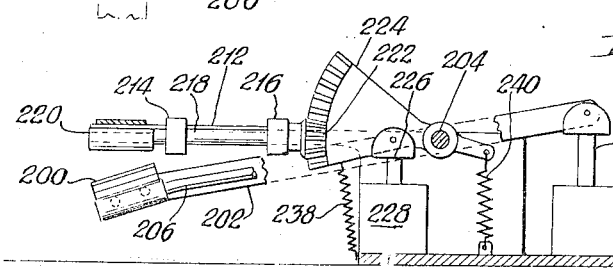
INVENTOR
ERHARD KLUG
BY
ATTORNEY Feb. 29, 1944.  E. KLUG  2,343,148
METHOD OF AND APPARATUS FOR TAPING ARTICLES
Filed April 30, 1942  5 Sheets-Sheet 5
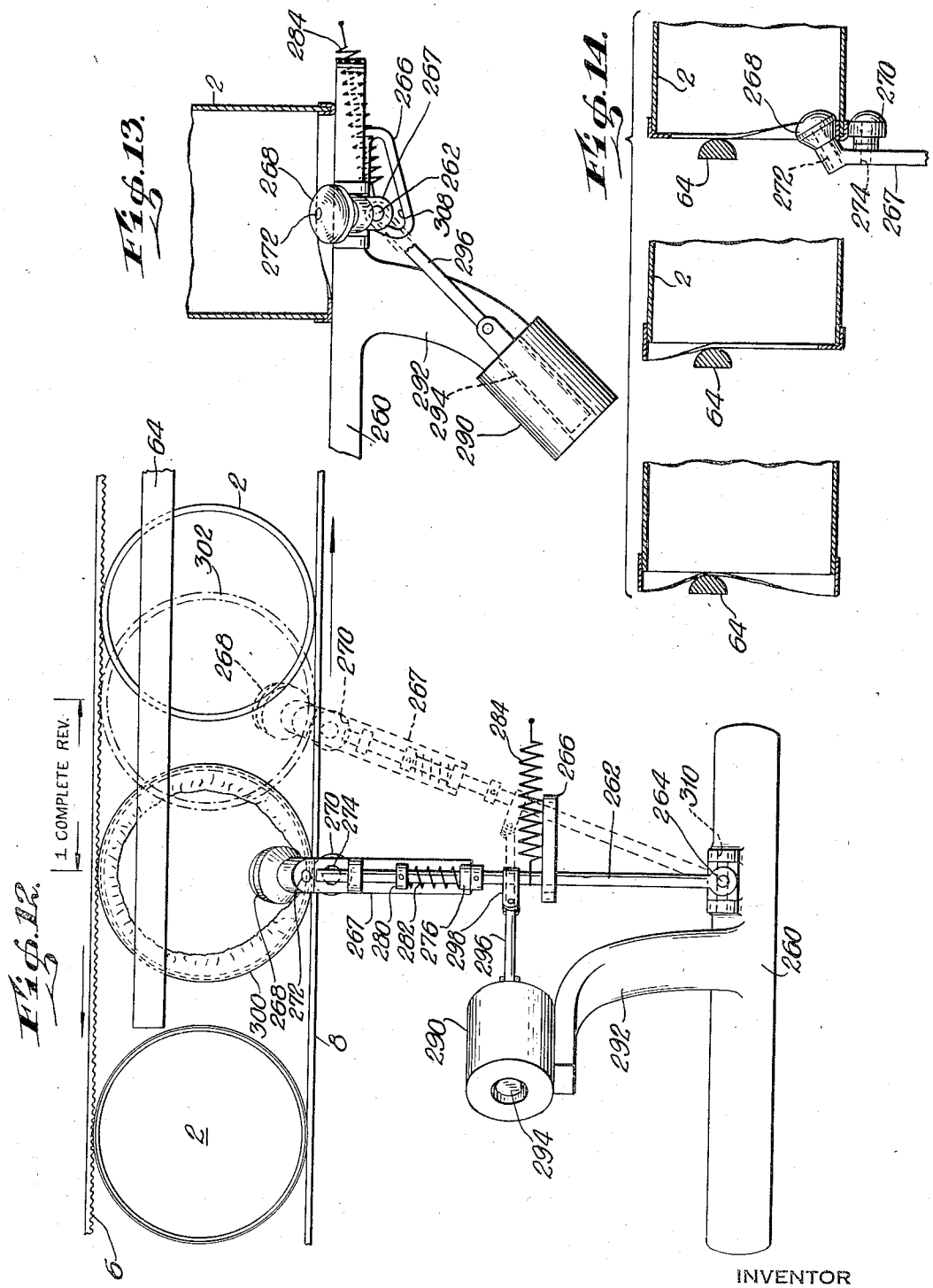
INVENTOR
ERHARD KLUG
BY
*Jeff Montgomery*
ATTORNEY Patented Feb. 29, 1944

2,343,148

UNITED STATES PATENT OFFICE 2,343,148

METHOD OF AND APPARATUS FOR TAPING ARTICLES

Erhard Klug, Suffern, N. Y.

Application April 30, 1942, Serial No. 441,229

24 Claims. (Cl. 93—36.9)

This invention relates to an improved method of and apparatus for taping articles with particular reference to the application of adhesive tape about articles of various types and for numerous purposes.

The various articles that are capable of being taped by the present invention include practically any article where tape is to be applied about the article, such, for example, as cylindrical containers, tubing and the like. Adhesive tape is applied about cylindrical containers to seal the seam formed by the cover so as to protect the contents against moisture, germs, insects, light, etc. The tape, when applied, serves also to retain the cover securely in place on the container. Adhesive tape, by the present invention, may be applied about a plurality of articles securely to fasten and hold the same together, and may also be applied to the annular rims or edges of tubing made of porous, hygroscopic or similar materials so as to protect the edges and/or seal the material against moisture, etc.

These are but a few of the articles capable of being taped by my present invention and as will be appreciated from the description to follow many other articles may be taped; hence I do not wish to be limited to the application of tape to any particular type of article or for any particular or specific purpose.

The tape employed by me may be the conventional adhesive tape, glued tape, heat sensitive tape or any other tape, at least one face of which is provided with an adhesive medium. If desired, I may employ unglued tape and apply glue or adhesive thereto in any well known manner as the tape is fed to the articles, or dried glued tape may be employed and moistened before application to the article in the conventional manner.

One of the objects of the present invention is the provision of a method and apparatus of the character indicated wherein the operation is fully automatic, continuous and uninterrupted even during the severing of the tape after the taping of each article.

In various types of machines for applying adhesive tape to articles considerable difficulty has been experienced in keeping the adhesive side of the tape from contacting parts of the machine, resulting in an accumulation of adhesive on the parts contacted. It has also been found difficult to support or hold the severed or lose ends of the tape intermediate application of the tape to successive articles. Attempts have been made to employ gripping fingers or the like for this purpose but at the point of gripping some of the adhesive is removed by the fingers and accumulates thereon.

Another object of the present invention resides in the provision of novel means for holding the tape during the severing operation and supporting the severed ends of the tape after severance.

Another object of the invention is the provision of a machine of the character indicated wherein accumulation of adhesive from the tape on any part of the machine is prevented.

A further object of the present invention is the provision of means for simultaneously severing the tape while completing the application of the same to one article and while initiating the application of the tape to the next succeeding article to be taped.

A still further object of the invention resides in forming a tab on the tape, when a tab is desired for ready removal of the tape, this tab forming also being fully automatic and accomplished during continuous operation of the machine and during the forwarding of the tape and articles.

A further object of the invention resides in the application of tape to the edges of articles and the folding of the tape over the edges or rims of the article for mechanical protection of the rim or edges of the articles and also to prevent the ingress of moisture where the article is of porous or of hygroscopic material.

Still further objects of the present invention will be manifest from the following description and the accompanying drawings.

In Figs. 1 to 11, inclusive, of the drawings, for the convenience of illustration, the articles shown are cylindrical containers wherein tape is to be applied over the seam formed by the cover. It is to be understood, however, that I do not wish to be limited to the application of tape to the particular articles illustrated inasmuch, as mentioned previously, my invention contemplates the application of tape to numerous types of articles.

In the accompanying drawings:

Fig. 1 is a side elevation of the apparatus;

Fig. 2 is a plan view of the same;

Fig. 3 is a section on line 3—3 of Fig. 1;

Fig. 4 is a plan view of the tape cut-off mechanism;

Fig. 5 is a side elevation of the same;

Fig. 6 is a fragmentary view showing two positions of the cut-off mechanism;

Fig. 7 is a side elevation of the tape guide roller;

Fig. 8 is a side elevation of combined tab forming and tape cut-off mechanism;

Fig. 9 is a similar view showing the position of the tab forming and tape cut-off mechanism after the severance of the tape;

Fig. 10 is a plan view of the combined tab forming and tape cut-off mechanism;

Fig. 11 is a side elevation of the same;

Fig. 12 is a side elevation of tape folding mechanism;

Fig. 13 is a plan view of the same; and

Fig. 14 illustrates three steps in folding the tape over the edge or rim of a tube.

Referring to the drawings in detail and first of all to the illustrations in Figs. 1, 2 and 3: Articles 2 to be taped are fed by gravity down an inclined feed table 4 where they are picked up between spaced conveyor belts 6 and 8 and forwarded past the taping station. Instead of a feed table I may provide a belt or chain, if desired. The conveyor belts 6 and 8 are driven at different speeds, as will be described presently.

For convenience of description I will refer to the belts 6 and 8 as upper and lower belts, respectively, as shown in the drawings. However, it will be appreciated that these belts may be arranged side by side so as to forward the articles in a vertical position as may be required should the articles contain liquid, for example. The positioning of these belts side by side for this purpose, it is to be understood, is within the purview of my invention.

The drive for the conveyor belts comprises a motor 10 mounted on the machine frame 12. The motor 10 has a motor pulley 16 over which passes a drive belt 18. The drive belt 18 passes over a pulley 20 mounted on a stub shaft 22 on which shaft is also mounted a pulley 24 over which passes a drive belt 26, the other end of the belt passing over large pulley 28. This pulley is mounted on shaft 30 to which is also affixed the left hand roller or pulley 32 of the lower conveyor belt 8, as viewed in Fig. 1.

A roller or pulley 36 for the upper conveyor belt 6 is mounted on shaft 38 directly above the roller or pulley 32. The shaft 38 also carries a sprocket 40 over which passes an endless sprocket chain 42. This chain passes about a sprocket 44 on shaft 46 to which is affixed the other or right hand roller or pulley 48 for the lower conveyor belt 8. The chain 42 passes from sprocket 44 about an idler sprocket 50 and thence about sprocket 52 on the shaft 30 of the left hand pulley 32 (as viewed in Fig. 1) of the lower conveyor belt 8 and thence about the sprocket 40 as previously mentioned.

The sprocket 40 for the upper conveyor belt pulley 36 and the sprockets 44 and 52 for the lower conveyor belt pulley 32 are of different diameters whereby the conveyor belts 6 and 8 are driven at different relative speeds, the purpose of which will be hereinafter described.

The conveyor belt roller or pulley for the end of the upper conveyor belt 6 opposite the pulley 36 is designated 60 and is mounted on shaft 62.

The outer face of either one or both conveyor belts may be provided with transverse corrugations 63 to provide increased traction between the belts and the articles. Instead of the corrugations 63 I may provide canvas or leather belts or belts faced with any suitable material to accomplish the desired result.

The conveyor belts convey the articles continuously forward in a straight path longitudinally of the machine. These belts serve to exert pressure on the articles as the same are forwarded thereby and inasmuch as the lower belt 6 is overspeeded with respect to the upper belt 8 not only will the articles be moved forward bodily but the articles will at the same time be rotated counter-clockwise on their individual axes. It is during this counter-clockwise and bodily forward movement of the articles that the tape is applied thereto, as will be described presently.

The articles are guided in their travel through the machine by side rails 64 positioned at each side of the machine.

The machine is adjustable so as to accommodate articles of various sizes, the shafts for the conveyor belt rollers or pulleys being mounted in brackets 70, adjustably mounted on the vertically extending rods 72 at each side of the machine.

Each pair of upper brackets 70 has downwardly extending arms 78, supporting cross bars 80 carrying a metal backing plate 82 and the side rails 64. The side rails 64 are mounted on brackets 65 which in turn are slidably mounted on the rods 82, so that these side rails may be adjusted laterally of the machine and clamped in adjusted position by the bolts 67.

By vertical adjustment of the brackets 70, it will be obvious that the conveyor belts 6 and 8 can be moved toward or away from each other to accommodate articles of smaller or larger diameter, this adjustment of the brackets also effecting vertical adjustment of the side rails 64 and the backing plate 82.

The guide rails 74 for the feed table can be moved toward and away from each other by releasing bolts 76 whereby to accommodate articles of shorter or longer lengths.

A tensioning roller 86 is provided for the belt 6 and is rotatably mounted in bearings 88 and 90 in bars 92 and 94, respectively, supported on the vertical rods 72. These bars are adjustably secured to the rods 72 by bolts 96 whereby they may be raised and lowered to adjust the pressure of the tensioning roller 86 on the belt 6. Similar adjustably mounted bars 98 are provided for a tensioning roller 100 for the lower conveyor belt 8.

Tape 104 to be applied to the articles 2 is taken from the supply roll 106 mounted on a shaft 108 in the lower portion of the machine. The roll 106 is adjustable along the shaft 108 so that the tape can be positioned in line with that portion of the article where the tape is to be applied. A conventional tensioning device may be applied to the roll of tape, if desired; although where an adhesive tape is used the tape is necessarily tensioned by simply pulling it from the supply roll.

The tape 104 passes from the supply roll over a rubber guide roller 110 with the tacky side of the tape remote from the roller surface.

The guide roller 110 is shown in detail in Fig. 7 from which it will be seen that the roller shaft 112 is mounted on an arm 113 pivoted at 114 in a mount 116. A metal plate designated 118 is secured to arms 113, the free end of this plate carrying an adjustable spring 119 which is anchored to the base of the support 116. The tension on the spring 119 may be adjusted by wing nut 122, so as to regulate the pressure exerted by the rubber roller 110.

The tape 104 is engaged between the guide roller 110 and one of the articles about to be taped whereby the tape is held during and immediately following the severing of the tape.

The tape cut-off mechanism 130 is mounted on the machine frame adjacent the roller 110. This cut-off mechanism, as shown in detail in Figs. 4, 5 and 6, comprises a knife 132 mounted on an arm 134 pivoted at 136 to a mount 138. The end of the arm 134 opposite the knife, as will be seen from Fig. 3, extends for a short distance beyond the pivot or fulcrum 136, as seen at 140. This extension 140 is pivotally secured to a plunger 141 of a solenoid 142. When the solenoid is energized in the manner to be described presently it will move the arm 140 downwardly raising the knife into engagement with the tape to sever the same.

The solenoid 142 of the cut-off mechanism is energized by a switch mechanism designated 144 in Figs. 1 and 2. This switch mechanism comprises a roller 146 mounted on a rocker arm 148 which is rocked in a counter-clockwise direction when the roller 146 is engaged by one of the articles being taped. This movement of the arm 148 closes a micro-switch in the housing 150 thereby closing the circuit to the solenoid 142 of the cut-off mechanism to actuate the knife and sever the tape.

The knife arm 134 also carries a bracket or clamp 152 for supporting two flexible rods 154 and 156. The rod 154 has a rubber roller 158 on its free end. The other rod 156 may or may not have a similar rubber roller. As the cut-off arm 134 is actuated to sever the tape the rods 154 and 156 are likewise actuated and moved upwardly into engagement with the underface of the tape to wipe the severed ends of the tape respectively to the articles 2 at each side of the knife, that is, to finish the application of the tape to the leading article 2 and at the same time initiate application of the tape to the immediately succeeding article.

When the solenoid 142 is deenergized by disengagement of the roller 146 from the leading article 2, the taping of which is completed, the cut-off arm 134 is returned to and held in inoperative position by spring 159 with the knife resting on a sponge or soft rubber stop or cushion 160.

The ratio of the linear speed of the belts 6 and 8 is predetermined. I prefer this ratio to be about 15:25 so as to rotate the articles for one and one-half revolutions during the application of the tape, thereby to apply one and one-half wraps or turns of the tape to the article before the tape is severed. This ratio of the conveyor belts 6 and 8 can be varied, of course, to provide a partial wrap, any number of wraps or any desired length of overlap of tape desired, as will be appreciated.

As the taping operation is completed and the tape severed, the articles continue their forward movement to a discharge station 162. This discharge station comprises a metal roof 164 having a ceiling or lining of resilient material 166 such as sponge or cellular rubber or any other suitable material. Adjacent a bottom plate 165 I provide a conveyor belt 168 passing over pulley 170 for conveying the articles through the station to a discharge chute 172 and thence out of the machine for packaging or shipment.

The resilient ceiling 166 functions to press the taped articles against the conveyor belt 168 securely to roll down the edges of the tape and to conform the tape to any dents or other unevenness in the surface of the article being taped.

In adjusting the machine to accommodate various size articles as aforesaid, the roof 164 of the discharge station can be raised and lowered as desired on vertically extending rods 167 and clamped in adjusted position by bolts 169. The guide roller 110 and the switch roller 146 can be adjusted along the machine bed to accommodate the different size articles as will be appreciated.

As previously mentioned, it is sometimes desired to have a tab formed on the tape whereby the tape can readily be removed from the article. The tab forming mechanism of my invention is shown in Figs. 8 to 11, inclusive. This mechanism is a combined tab forming and tape cut-off mechanism and may be substituted, when desired, for the tape cut-off mechanism shown in Figs. 4 and 5.

As will be seen from Figs. 8 and 9, two star wheels 180 driven through any suitable drive such as gears 183 or by engagement with the articles 2 are mounted above the cut-off mechanism in position to engage the articles 2 as they advance, the function of these wheels being to maintain sufficient space between the leading pair of articles 2 to provide a sufficient length of tape for the tab and to permit the tab forming mechanism to operate.

In the apparatus illustrated in Fig. 8 I show a heater 182 which is mounted so as to be adjacent the tape as the tape is withdrawn from the spool or supply roll 184. This is to illustrate the use of heat sensitive tape. It is to be understood, however, that this showing is merely illustrative inasmuch as the supply roll 106 of Fig. 1 could be here employed, while the showing in Fig. 8 could as readily be employed in the apparatus of Fig. 1. The spool of tape shown in Fig. 8 has a conventional friction disc 186 for braking or preventing free rolling of the spool.

Tape is withdrawn from the spool 184 as the same is applied about the leading article 2 in a manner similar to that already described. After moving past the heater 182 the tape passes over a roller 188 which is similar to the roller 110 and thence about the article to be taped.

The tape cut-off mechanism of the combined cut-off and tab forming mechanism of Figs. 8–11 comprises a knife 200 mounted on arm 202 which is pivotally mounted on shaft 204. This arm also carries a tape handling rod 206 similar to the rod 154 of Fig. 4. The knife arm 202 is connected to a plunger 208 of a solenoid 210 and operates in the manner similar to the cut-off mechanism of Figs. 4 and 5.

The tab forming part of this combined unit comprises a stationary tape supporting arm 212 having laterally projecting supports 214 and 216 providing bearings for rod 218 which is provided with a flap plate 220 at one end and a bevel gear 222 at its other end. The shaft 204 carrying the knife 200 also carries a sector rack 224 pivotally mounted on the shaft, and meshing with the bevel gear 222. This rack is rocked on the shaft 204 by the plunger 226 of a solenoid 228.

With the combined tape cut-off and tab forming mechanism applied to the apparatus of Fig. 1 both the solenoids 210 and 228 receive current from the source of supply there illustrated and are energized by the micro-switch 144.

When the solenoids 210 and 228 are energized the leading pair of articles 2 will have been engaged by the star wheels 180 and the cut-off knife 200 will be moved from the position shown in Fig. 8 to the position shown in Fig. 9 due to energization of solenoid 210 to sever the tape. At the same time due to energization of solenoid 228 the rack 224 will be actuated and through the bevel gear 222 the rod 128 will be given a partial turn to move the flap plate 200 from the position shown in Fig. 8 to that shown in Fig. 9 to carry the trailing end of the severed tape against the tape already applied to the leading article, as plainly seen in Fig. 9. At the same time the rod 206 has moved from the position shown in Fig. 8 to the position shown in Fig. 9 to carry the leading end of the severed tape against the immediately succeeding article to be taped, initiating the application of the tape thereto.

To insure a looping of the tape, as shown at 234, in this stage of the tab forming operation I apply a blast of air to the inner face of the tape, as seen in Fig. 9, the tape at that moment lying upon the flat portion of stationary plate 230 of the tape supporting arm 212.

The blast of air is supplied from a nozzle 232 which may be connected to a suitable source of supply such as a compressed air tank (not shown).

It will be appreciated that as the leading article 2 continues its forward bodily movement while rotating, as previously described, upon its own axis, the loop will be folded upon itself upon engagement with the upper belt 6 as shown in broken lines in Fig. 9 to close the loop and form a tab 236 as also illustrated in Fig. 9.

The springs 238 and 240 are provided to return the knife arm 202 and the sector 224, respectively, to their inoperative positions after each severing and tab forming operation, the flap plate returning to its initial position also due to the actuation of the sector rack 224 by its spring 240.

The operation of the apparatus illustrated and described will readily be understood from the description thus far given. However, the operation briefly is as follows: The articles to be taped as illustrated are cylindrical containers 2 with short flanged covers 3, as shown in Fig. 3. The seam 5 formed by the covers in the illustration given is to be completely covered with adhesive tape.

The supply roll 106 of the tape is positioned in alignment with the seam 5 of the container whereby the tape will cover the seam and extend beyond both sides of the same.

Assuming that the containers 2 have been placed on the feed table 4 and the leading container engaged by the conveyor belts and moved to position adjacent the roller 110, the end of the tape is then brought over the roller 110 and adhesively secured to the periphery of the container adjacent the roller 110.

The switch to the motor 10 is then closed to drive the conveyor belts 6 and 8 as previously described. As the belts engage the containers they rotate the same in a counter-clockwise direction while at the same time moving the containers bodily forward.

When the first container has made one and one-half revolutions and has received one and one-half turns or wraps of tape it will have moved over the roller 146 of the micro-switch 144 thereby closing the circuit to the cut-off mechanism. The cut-off mechanism then severs the tape and the rods 154 and 156 are brought into engagement with the free ends of the severed tape to wipe these ends into engagement with their respective containers, the rod 156 completing the application of the tape to the leading article and the rod 154 initiating the application of the tape to the next succeeding article to be taped. The cut-off mechanism is then returned to its initial position by its spring and remains in this position until the next article receives one and one-half turns or wraps of tape and is in position to actuate the micro-switch 144. The operation is then repeated.

As the containers are moved from the taping station to the discharge station the belt 6 presses the tape about the container and at the discharge station the belt 168 and the resilient ceiling will complete the pressing of the tape in place.

When the combined tape cut-off and tab forming units of Figs. 8 to 11, inclusive, are substituted for the tape cut-off mechanism of Fig. 1 the operation is the same except that a tab is formed in the tape as previously explained.

When it is desired to apply tape over the edge of an article the supply roll 106 is positioned on its shaft so that its center line is in alignment with the end of the article. As the articles are rotated the projecting portion of the tape will engage the curved or rounded side of the frame of the machine and will be turned over thereby. Should it be desired that more or less than one-half of the tape be turned over the edge of the article the tape is then aligned with the edge or end of the container accordingly.

It will be appreciated that I may apply more than one tape to the article during the forward movement of the articles through the machine, if so desired. This is accomplished by mounting a second spool of tape on the same shaft as the supply roll 106 in alignment with the portion of the article to receive the second tape adjacent the other end of the article. A duplicate cut-off mechanism could readily be mounted at the opposite side of the machine from the cut-off mechanism 130 so as to sever the second tape in the same manner as the tape 106 is severed.

The modification illustrated in Figs. 12 to 14 is provided for folding the tape over the edges or rims of articles as hereinbefore mentioned.

When it is desired merely to fold the tape at right angles over the edge of an article, as distinguished from folding the same completely over the edge to the inside, the folding is done by the tape contacting or engaging the side rail 64 at the side of the machine where the tape is being applied. Of course, if tape is being applied at both ends of the article the same will engage the rails at both sides of the machine.

These rails are provided with a curved side or rounded wall, as clearly seen from Fig. 14. In applying the tape to provide a right angle fold over the peripheral edge of the article the tape is fed in the same manner as shown and described with respect to Figs. 1 to 3 except that the tape roll 106 is positioned on the shaft 108 whereby the tape will project beyond the end of the articles. Likewise the severing operation is the same as in the form illustrated in Figs. 1 to 6, inclusive.

As the tape is applied to the container the projecting edge of the tape engages the curved or rounded face of the cross bar 64. The rotation of the article with the tape engaging the side rail will cause the tape to be folded over the peripheral edge of the end of the article. Three steps of this folding operation are illustrated in Fig. 14.

When it is desired to carry the folded-over portion of the tape completely about the edge or rim of cylindrical hollow articles, such as tubing, and secure it adhesively to the inside of the article whereby the edge or rim is completely covered, the mechanism illustrated in Figs. 12 and 13 is employed.

This mechanism comprises a support 260 adapted to be mounted on the machine bed adjacent and to the right of the cut-off mechanism, as viewed in Fig. 1. A rod 262 is pivoted at 264 in said support. This rod extends through a slotted cam 266 and is provided with a sliding extension 267 having at its upper end a pair of tape folding rollers 268 and 270. The roller 268 is preferably a bevelled roller and is mounted for rotation on a stub shaft 272 extending from the end of the rod extension 267 at a 45° angle. The roller 270 is mounted for rotation on a stub shaft 274 extending at an angle from the rod extension 267. As will be seen from Fig. 14 these rollers are so spaced as to fit over the edge or rim of the cylindrical article.

The rod extension 267 is provided with a collar 278 and the rod 262 has a similar collar 280, a spring 282 being mounted on the rod 262 between these collars. This spring is placed under compression as the rod extends whereby to return the same to its contracted or normal position as will be described presently.

A spring 284, one end of which is attached to the rod 262 and the other end to a part of the machine, retains the rod 262 in engagement with one track of the cam 266, as will be described hereinafter.

A solenoid 290 is mounted on a bracket 292 of the support 260. This solenoid, as will be seen from Fig. 13, is positioned at an angle to the machine bed. The plunger 294 of the solenoid has a rod 296 pivotally attached thereto, the other end of which is pivotally mounted in a collar 298 on the rod 262.

The solenoid is actuated by the switch 148 and is operated in timed relation to the cut-off mechanism.

When the rollers 268 and 270 are in the position shown in full lines in Figs. 12 and 14 with the rollers engaging the edge or rim of the article, as illustrated in Fig. 14, the rollers are swung with the article longitudinally of the machine for a short distance during one complete rotation and advancing of the article from the position shown in full lines in Fig. 12, designated 300, to the position shown in dotted lines, designated 302. As the article thus advances carrying the rollers and rod with it, the rod extension 267 will slide on the rod 262, the rod moving in the slotted cam 266 and being held against the inner track of the cam by means of the spring 284. In this movement of the rod 262 the lower end of the same will pivot at 264. When the article has made a complete revolution and the tape has been folded or tucked over the edge of the article, the rod 262 will have reached the limit of its travel at which time the circuit to the solenoid will be closed, energizing the solenoid, whereby the plunger thereof will be retracted. The retraction of the plunger by reason of the angle at which the solenoid is mounted will withdraw the rollers from the articles by causing the rod 262 to ride along the track 308 of the cam 266 to its initial position. As the solenoid is deenergized rollers 268 and 270 will be moved adjacent the next article and over the edge of the article by means of the spring 284, ready for the next cycle of operation. During the movement of the rollers into and out of the article the rod 262 pivots on the stub shaft 310 of the connection 264.

If it should be desired to apply more than one thickness or turns of tape to the article, the ratio of the linear speeds of the conveyor belts can be adjusted or changed as described in connection with Figs. 1 to 3.

It is to be understood that while I have illustrated and described my invention as applying adhesive tape to cylindrical containers to seal the covers and to cylindrical tubing to seal and protect the rims or edges thereof, I do not wish to be limited to this application inasmuch as previously mentioned my method and apparatus have manifold applications.

It is to be understood also that various changes and modifications may be made in the apparatus herein illustrated and described without departing from the spirit and scope of my invention.

What I claim is:

1. The method of applying adhesive tape to articles, which method comprises continuously feeding a strip of tape, continuously feeding the articles to be taped, wrapping the tape about an article during its forward movement, adhesively attaching the tape to another article to be taped to maintain the tape taut between the articles and severing the tape at the point between the articles substantially simultaneously with the attaching of the tape to the next successive article.

2. The method of applying adhesive tape to articles, which method comprises continuously feeding a strip of tape, continuously feeding articles to be taped, applying the tape about the articles successively while the tape and articles are being moved forward in a straight path, holding the tape against adjacent articles to be taped to maintain the tape taut between the articles, severing the tape at a point between the articles and substantially simultaneously adhesively attaching one of the severed ends of the tape to the next successive article to initiate the application of the tape thereto.

3. The method of applying adhesive tape to articles, which method comprises continuously advancing a strip of the tape, continuously advancing articles be taped, applying the tape about one article, severing the tape and folding a portion of the tape upon itself to form a tab.

4. The method of applying adhesive tape to articles, which method comprises continuously advancing a strip of the tape and articles to be taped, applying the tape about one of the articles, severing the tape after application to the article, folding one of the severed ends of the tape upon itself to form a tab while applying the other severed end of the tape to the next successive article to be taped to initiate the taping of the said next article.

5. The method of applying adhesive tape to articles, which method comprises continuously advancing a strip of tape, continuously advancing articles to be taped, applying the tape about the articles successively, severing the tape after application to each article, applying a blast of air to the adhesive face of the severed end of the tape, attaching the extreme end of the said severed end of the tape to the article and folding the tape along a transverse line adjacent the portion receiving the air blast over upon itself to form a tab in the tape.

6. The method of applying adhesive tape to articles, which method comprises continuously advancing a strip of the tape, continuously advancing articles to be taped, applying the tape to the edge of successive articles with a portion of the tape projecting beyond the edge of the article, folding the projecting portion of the tape over the edge of the article and severing the tape.

7. The method of applying adhesive tape to articles, which method comprises continuously advancing a strip of tape, applying the tape adjacent the edge of the articles successively with a portion of the tape projecting beyond the article, folding the projecting portion of the tape over the edge of the article and simultaneously severing the tape while completing the application of the tape to one article and while initiating the application of the tape to the next successive article to be taped.

8. The method of applying adhesive tape to articles, which method comprises continuously advancing a strip of the tape and articles to be taped, applying the tape adjacent the edge of one of the articles with a portion of the tape projecting beyond the edge, folding the projecting portion of the tape about the edge of the article to the inside thereof and holding the trailing end of the tape against the next successive article to be taped to initiate the taping of the said next article.

9. In an apparatus for applying tape about articles comprising in combination, continuously moving conveyor belts spaced from each other to receive the articles to be taped, the leads of said belts contacting the articles moving in opposite directions and at different relative speeds whereby to rotate the articles about their individual axes and to forward the same bodily past a tape supply and means for directing the tape continuously from the tape supply to the articles whereby tape is applied to the periphery of the articles.

10. Apparatus for applying adhesive tape about articles comprising in combination, means for continuously rotating the articles on their individual axes and for continuously forwarding the articles bodily while tape is applied thereto, tape cut-off mechanism for severing the tape after application of the tape to an article while the article is moving forward, and means for picking up the ends of the severed tape and applying one of the ends to one article to complete the taping of that article and applying the other end of the severed tape to the successive article to be taped to initiate the application of the tape to the last mentioned article.

11. Apparatus for applying adhesive tape about articles comprising in combination means constituting a station for a supply of tape, means for continuously rotating the articles to be taped and for continuously forwarding the same bodily while the tape is applied thereto, tape cut-off mechanism for severing the tape during the continuous movement of the article and after application of the tape to an article, means carried by the cut-off mechanism for picking up the ends of the severed tape and applying one of the ends to one article to complete the taping of that article and applying the other end of the severed tape to the next article to be taped to initiate the application of the tape to the last mentioned article, and automatic means for acuating said cut-off mechanism.

12. Apparatus for applying adhesive tape about articles comprising in combination means constituting a station for a supply of tape, a pair of conveyor belts for continuously rotating the articles to be taped and for forwarding the same bodily while the tape is applied thereto, a cut-off arm, a knife carried thereby for severing the tape, tape pick-up means carried by said arm for picking up the ends of the severed tape and applying one of the ends to one article and applying the other end of the severed tape to the next article to be taped, means for actuating said arm into operative position in timed relation to the completing of the tape applying operation.

13. Apparatus for applying adhesive tape about articles comprising in combination means constituting a station for a supply of tape, a pair of conveyor belts, means for driving said belts at different speeds, said belts continuously rotating the articles to be taped and forwarding the same bodily while the tape is applied thereto, tape cut-off mechanism for severing the tape after application of the tape to an article, means for picking up the ends of the severed tape and applying one of the ends to one article and applying the other end to the next article to be taped, a discharge station for the articles and means at said discharge station for pressing the tape on the article.

14. A machine for taping articles comprising in combination means constituting a station for a supply of adhesive tape, a pair of spaced conveyor belts, means for feeding articles to between said belts whereby the belts continuously advance the articles, means for driving said belts at different relative speeds whereby to impart a rotary motion to the articles and simultaneously to forward said articles bodily in a direction opposite to the rotary motion, tape cut-off and tape applying means comprising a pair of rods and a knife intermediate said rods, means for automatically operating said cut-off and applying means in timed relation with the taping of the articles, said last mentioned means being actuated by the article being taped to operate said cut-off and applying means whereby said knife will sever the tape and said rods will pick up the severed ends of the tape and apply the same to articles at either side of said knife.

15. A machine for taping articles comprising in combination a support for a supply of adhesive tape, a feed table for articles to be taped, said table being adjustable to accommodate articles of different lengths, an upper and a lower conveyor belt for continuously advancing the articles, means for adjusting said belts vertically to accommodate articles of various diameters, tensioning means for each of said belts, means for driving said belts at different relative speeds whereby to impart a rotary motion to the articles and simultaneously to forward said articles bodily in a direction opposite to the rotary motion, tape cut-off and applying means comprising a pair of rods and a knife intermediate said rods, means actuated by the articles being taped for automatically operating said cut-off and applying means in timed relation with the taping of the articles, whereby said knife will engage the tape on the unglued face and sever the same and said rods will pick up the severed ends of the tape and apply the same to articles at either side of said knife.

16. In a machine of the class described the combination of means constituting a tape supplying station, means for continuously forwarding articles to the tape applying station to be taped, tape cut-off mechanism for severing the tape after application to the article, and means for forming a tab in the tape adjacent the severed end of the tape.

17. A machine for taping articles comprising in combination a support for a supply of tape, means for continuously advancing articles to be taped, tape cut-off mechanism, and tab forming mechanism, said tab forming mechanism comprising a flap plate and a tape supporting plate adjacent thereto, means for holding one end of the severed tape on said tape supporting plate, means for rocking said flap plate to carry the said severed end of the tape against the article upon the severing of the tape by said cut-off mechanism whereby the said severed end of the tape will be applied to the article to form a loop at the held portion, the rotation of the taped article in contact with the article forwarding means causing said loop to be closed whereby to form a tab on said tape.

18. In a machine of the class described the combination of article feeding means, a support for a supply of tape, means for continuously advancing articles to be taped while tape is applied thereto, means in the path of the articles for spacing the articles from each other, a tape cut-off knife, tab forming mechanism adjacent said knife comprising a relatively stationary plate and flap plate for supporting the severed end of the tape, an air nozzle for directing a blast of air to the tape supported on said plates whereby to hold a portion of the tape out of contact with the article, means for pivoting said flap plate whereby to fold the tape transversely to initiate the forming of a tab to apply the end of the tape to the article, the continued rotation of the article in contact with the said article advancing means completing the formation of a tab.

19. In an apparatus for applying adhesive tape to articles comprising in combination a support for a supply of tape, a tape applying station, tape cut-off mechanism, means for forwarding the articles successively past the tape applying station where the tape is applied thereto and past the cut-off mechanism where the tape is severed, and means for folding the tape longitudinally over the edge of the article to be taped whereby the same will adhesively be applied to the periphery and end of the article.

20. Apparatus for applying adhesive tape over the edges of hollow cylindrical articles comprising in combination a support for a supply of tape, means for continuously rotating the articles to be taped and for forwarding the same bodily while the tape is applied thereto with a portion of the tape projecting beyond the end of the article, means in the path of the articles for folding the projecting portion of the tape completely about the edges of the wall of the articles whereby adhesively to secure the tape about the rim or edge of each article, and tape cut-off mechanism for severing the tape upon application of the tape to successive articles.

21. Apparatus for applying a protective adhesive tape over the peripheral edges of hollow cylinders comprising in combination a support for a supply of tape, a continuously moving conveyor belt for rotating the articles to be taped and for forwarding the same bodily in a direction opposite to the direction of rotation, means for guiding the tape in alignment with the ends of the articles with a portion of the tape projecting beyond the ends of the articles and for adhesively applying the non-projecting portion to the outside wall of the article, means in the path of the articles for turning the projecting portion of the tape over the edge of the article and adhesively applying the same to the edge and inside wall of the article.

22. Apparatus for applying adhesive tape to the peripheral edges of hollow cylindrical articles comprising in combination a support for a supply of tape, means for continuously rotating the articles to be taped and for forwarding the same bodily while the tape is applied thereto, a guide roller for guiding the tape into contact with the end of the article with a portion of the tape projecting beyond the end of the article, tape folding rollers in the path of the projecting portion of the tape for folding the tape over the edge of the wall of the article whereby adhesively to secure the tape over the edge or rim of the article and to the inside and outside thereof, automatically operable means for moving said rollers into and out of tape folding position and tape cut-off mechanism automatically operable to sever the tape after application of the same to successive articles.

23. Apparatus for applying adhesive tape to the peripheral edges of hollow cylindrical articles comprising in combination a support for a supply of tape, means for continuously rotating the articles to be taped and for forwarding the same bodily while the tape is applied thereto, means for guiding the tape into contact with the articles successively with a portion of the tape projecting beyond the end of the article, a rail in the path of the projecting portion of the tape for folding the same over the edge of the article, a pivotally mounted arm, tape folding rollers carried by said arm, automatic means for moving said rollers into and out of contact with the folded portion of the tape whereby to fold the tape over the edge of the article and adhesively to secure the same to the inside of the wall of the article, tape cut-off mechanism for severing the tape upon application to successive articles, said tape cut-off mechanism and said means for moving said rollers being actuated in timed relation.

24. Apparatus for applying adhesive tape to the peripheral edges of hollow cylindrical articles comprising in combination a support for a supply of tape, means for continuously rotating the articles to be taped and for forwarding the same bodily while the tape is applied thereto, means for guiding the tape into contact with the articles successively with a portion of the tape projecting beyond the end of the article, a rail in the path of the projecting portion of the tape for folding the same over the edge of the article, a rod, an extension on said rod, a tape folding roller carried by said extension, a slotted cam, said rod extending through said cam, a spring for holding said rod as the same rides on one track of said cam whereby to move said roller into engagement with the folded over portion of the tape and to move the tape into the inside of the article adhesively to secure the tape to the inside of the article, a solenoid connected to said rod retracting said roller out of contact with the tape and moving the rod along one track of said cam to position said roller in alignment with the next successive article, tape cut-off mechanism, and means for actuating said cut-off mechanism in timed relation with the operation of the said tape folding roller.

ERHARD KLUG.